US009578555B2

(12) United States Patent
Li et al.

(10) Patent No.: US 9,578,555 B2
(45) Date of Patent: Feb. 21, 2017

(54) EVENT BASED EUICC FALL-BACK

(71) Applicant: Telefonaktiebolaget L M Ericsson (publ), Stockholm (SE)

(72) Inventors: Qiang Li, Täby (SE); Justus Petersson, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 118 days.

(21) Appl. No.: 14/236,446

(22) PCT Filed: Nov. 29, 2013

(86) PCT No.: PCT/SE2013/051418
§ 371 (c)(1),
(2) Date: Jan. 31, 2014

(87) PCT Pub. No.: WO2015/080638
PCT Pub. Date: Jun. 4, 2015

(65) Prior Publication Data
US 2015/0156679 A1 Jun. 4, 2015

(51) Int. Cl.
*H04L 12/70* (2013.01)
*H04W 36/00* (2009.01)
*H04W 8/18* (2009.01)

(52) U.S. Cl.
CPC ......... *H04W 36/0022* (2013.01); *H04W 8/183* (2013.01)

(58) Field of Classification Search
CPC .. H04W 24/04; H04W 36/0022; H04W 36/22; H04W 48/20

(Continued)

(56) References Cited

U.S. PATENT DOCUMENTS 8,254,981 B2 * 8/2012 Dwyer ................. H04W 48/16
455/424
8,644,178 B1 * 2/2014 Oroskar ............. H04W 72/085
370/229

(Continued)

OTHER PUBLICATIONS

European Telecommunications Standards Institute, "Technical Committee Smart Card Platform (TC SCP) TC SCP REQ Meeting #38, Osaka, Japan, May 28-30, 2012 Report", ETSI TS SCP REQ Meeting #39, Freising, Germany, Sep. 24, 2012, pp. 1-24, Tdoc SCPREQ(12)000070r1, ETSI.

(Continued)

*Primary Examiner* — Wei Zhao
*Assistant Examiner* — Sai Aung
(74) *Attorney, Agent, or Firm* — Coats & Bennett, PLLC

(57) ABSTRACT

The present disclosure relates to a method performed by a connectivity service platform (2) in a communication network (1). The method comprises storing a fall-back policy. The method also comprises sending a policy message comprising information about the fall-back policy to a radio device (5) comprising an eUICC (6). The method also comprises detecting an event relating to a first subscription of the radio device with a first network operator (7) for a wireless network connection. The method also comprises sending an event message comprising information about the detected event to the radio device via the wireless network connection of the first subscription. The method also comprises determining that the detected event implies that the radio device will lose the network connection of the first subscription. The method also comprises falling back in accordance with the stored fall-back policy, thereby enabling the connectivity service platform to communicate with the radio device via a network connection of a second subscription of the radio device instead of the first subscription.

21 Claims, 5 Drawing Sheets

(58) Field of Classification Search
USPC .................... 370/328–331; 455/426, 446
See application file for complete search history.

(56) References Cited

U.S. PATENT DOCUMENTS

| | | | | |
|---|---|---|---|---|
| 8,825,044 | B2* | 9/2014 | Oroskar | H04W 48/20 455/432.1 |
| 2010/0062779 | A1* | 3/2010 | Bienas | H04W 24/04 455/446 |
| 2012/0329521 | A1 | 12/2012 | Jacobs et al. | |
| 2013/0150032 | A1 | 6/2013 | Pattaswamy et al. | |
| 2014/0198640 | A1 | 7/2014 | Suzuki et al. | |
| 2014/0370886 | A1* | 12/2014 | Lisak | H04W 36/0022 455/426.1 |

OTHER PUBLICATIONS

GSM Association, "Embedded SIM Task Force Requirements and Use Cases", Non-confidential White Paper, Feb. 21, 2011, pp. 1-38, GSM Association.
European Commission, "Large Scale Integrating Project EXALTED Expanding LTE for Devices", Feb. 29, 2012, pp. 1-115, FP7 Contract No. 258512, Seventh Framework Programme, Deliverable 5.1.
GSM Association, "Remote Provisioning Architecture for Embedded UICC", Jul. 1, 2013, pp. 1-82, Version 1.43, GSM Association.
European Telecommunications Standards Institute, "Smart Cards; Machine to Machine UICC; Physical and logical characteristics (Release 9)", Technical Specification, ETSI TS 102 671 V9.1.0, Sep. 1, 2011, pp. 1-21, ETSI.
European Telecommunications Standards Institute, "Smart Cards; Embedded UICC; Requirements Specification (Release 12)", Technical Specification, ETSI TS 103 383 v12.2.0 , Sep. 1, 2013, pp. 1-20, ETSI.

* cited by examiner

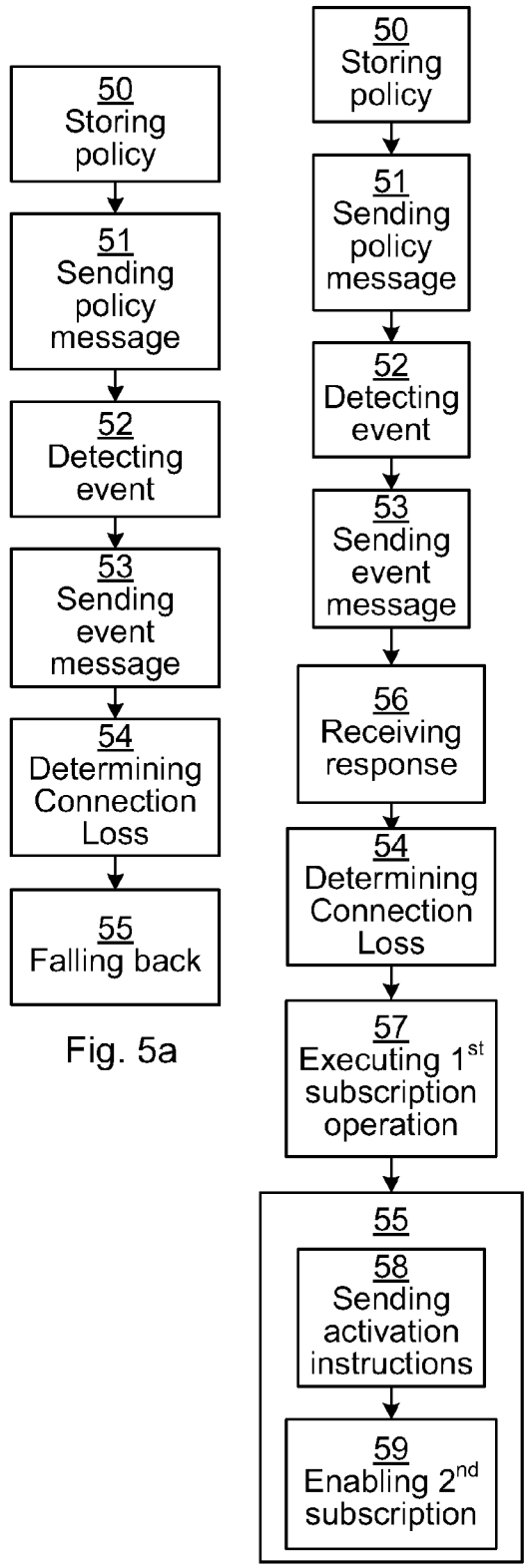
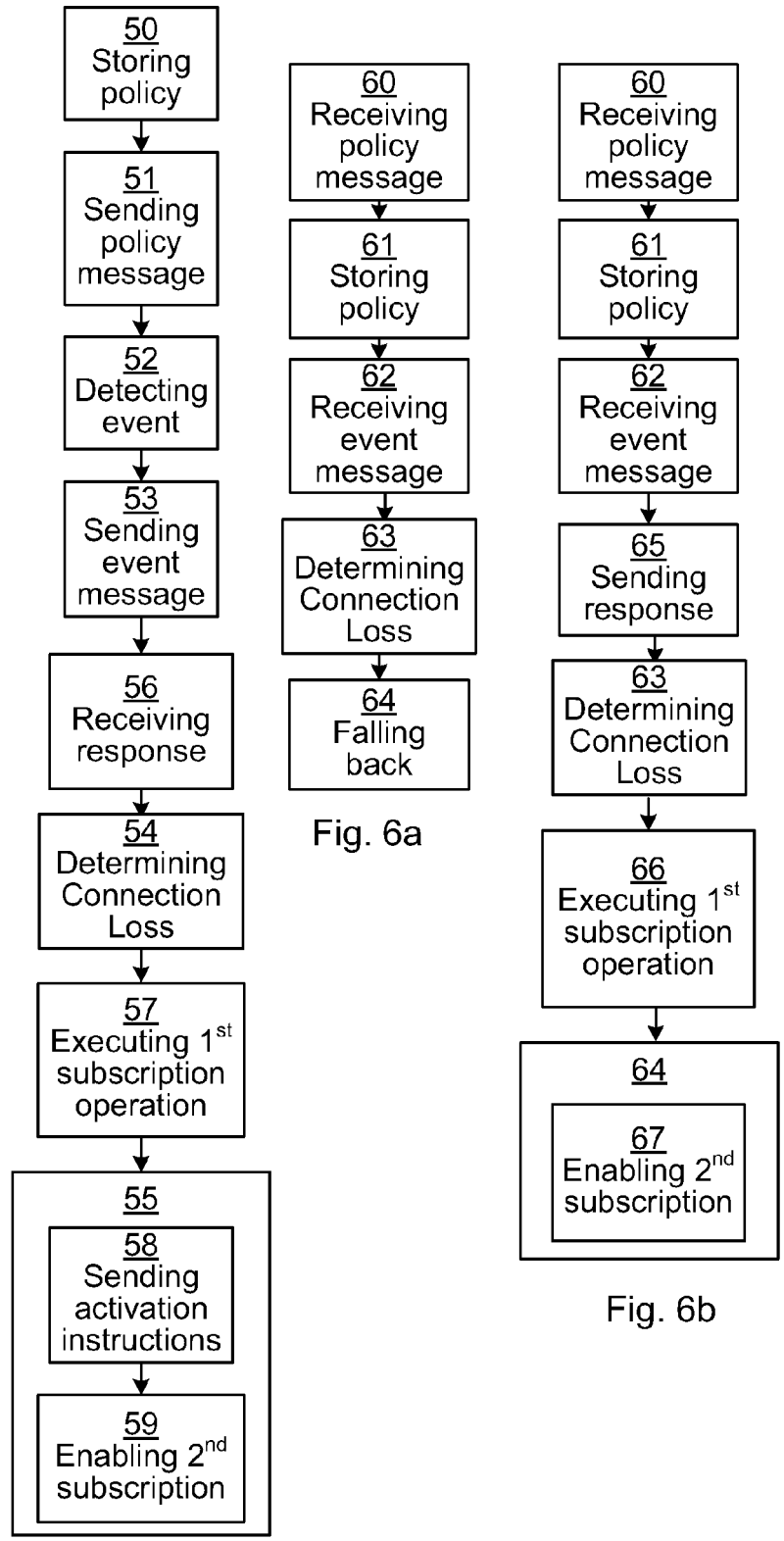
Fig. 5a
Fig. 5b
Fig. 6a
Fig. 6b

EVENT BASED EUICC FALL-BACK

TECHNICAL FIELD

The present disclosure relates to methods and devices of a communication network for managing subscriptions for wireless connection of a radio device having an embedded Universal Integrated Circuit Card (eUICC).

BACKGROUND

Unlike a traditional UICC Subscriber Identity Module (SIM) card used in a consumer device, e.g. a mobile phone, all eUICC that are deployed in e.g. Machine-to-Machine (M2M) solutions and embedded into the M2M device cannot easily be accessed by human intervention to switch the SIM card manually during the device life cycle. According to the Global System for Mobile Communications (GSM) Association (GSMA) eUICC standard (GSMA "Remote Provisioning Architecture for Embedded UICC" DRAFT 1.39 29th April 2013) and European Telecommunications Standards Institute (ETSI) eUICC Standard (EXALTED "Expanding LTE for Devices" FP7 Contract Number: 258512, Feb. 29, 2012), all eUICC shall be delivered with a pre-installed provisioning subscription for remote provisioning/bootstrapping purpose (i.e. a provisioning/bootstrapping operator provides initial bootstrapping connectivity for eUICC in order to enable late binding feature i.e. to remotely provision the $1^{st}$ eUICC operational subscription to the eUICC when the device (e.g. a car) comprising the eUICC is shipped from initial manufacturer country to the destination country ($1^{st}$ operational subscription could be provided by the local operator from the destination country), and then later to change the eUICC active operational subscription from the current operator subscription to an new operator (due to the location being changed to another country, or changed operator subscription) during the device/eUICC long life cycle (15-20 years), in order to avoid high roaming fee and/or single operator lock-in situation during the device long life cycle e.g. in the automotive industry or for smart metering/security cameras etc.

However, eUICC connectivity may be lost permanently during subscription management lifecycle through operations such as enable/disable/activate/pause/deactivate/terminate/etc. In such cases the eUICC and network must fall back to an available subscription to recover the initial connectivity.

Chapter 3.5.12 "Fall-Back Mechanism" of GSMA "Remote Provisioning Architecture for Embedded UICC" DRAFT 1.39 29th April 2013 states that in the event of loss of network connectivity, as detected by the device, there is a need to change to the profile with fall-back attribute set. In this case the eUICC disables the currently enabled Profile (Profile A) and enables the Profile with Fall-back Attribute set (Profile B). The device reports network loss to the eUICC. The eUICC is configured to perform the fall-back mechanism if certain network connectivity issues are reported by the Device.

SUMMARY

It has been realised that it may be difficult to fall back since the radio device has lost network connectivity and may not have an active secondary subscription to fall back to. It can thus not contact a wireless network of another operator to set up another subscription since it does not have network connectivity.

Subscriptions of radio devices, e.g. M2M devices, may be handled via a connectivity service platform, e.g. the Ericsson Device Connection Platform (DCP) or other hosted core network (CN) or home public land mobile network (Home PLMN or HPLMN) which may be used by several different network operators to manage subscriptions for radio devices having eUICC (since the subscriptions are not handled manually by inserting a UICC card in the device). Thus, a host may host a multi-tenant home location register (HLR) and other core network nodes (Gateway General Packet Radio Service (GPRS) support node (GGSN), short message service centre (SMSC), etc.) in HPLMN as a core network service for all customer operators. All the M2M subscribers of the operators are registered and stored on hosted HLR. Connectivity is provided as a service to all operators hosted on the platform. On top of the core network service, also a cloud business support system (BSS) may be hosted to provision and manage subscriber data, processes, billing, etc. In accordance with the present disclosure, eUICC features are added in the connectivity service platform to meet the new developments within this field (eUICC for M2M connections from vehicles (cars), smart metering, security camera, and also for consumer electronics).

According to an aspect of the present disclosure, there is provided a method performed by a connectivity service platform in a communication network. The method comprises storing a fall-back policy. The method also comprises sending a policy message comprising information about the fall-back policy to a radio device comprising an eUICC, said radio device having a wireless network connection. The method also comprises detecting an event relating to a first subscription of the radio device with a first network operator for a wireless network connection. The method also comprises sending an event message comprising information about the detected event to the radio device via the wireless network connection of the first subscription. The method also comprises determining that the detected event implies that the radio device will lose the network connection of the first subscription. The method also comprises falling back in accordance with the stored fall-back policy, thereby enabling the connectivity service platform to communicate with the radio device via a network connection of a second subscription of the radio device instead of the first subscription.

According to another aspect of the present disclosure, there is provided a computer program product comprising computer-executable components for causing a connectivity service platform to perform an embodiment of the method performed by a connectivity service platform, of the present disclosure, when the computer-executable components are run on processor circuitry comprised in the connectivity service platform.

According to another aspect of the present disclosure, there is provided a connectivity service platform for a communication network. The platform comprises processor circuitry, and storage storing instructions that, when executed by the processor circuitry, cause the connectivity service platform to store a fall-back policy. The instructions also cause the platform to send a policy message comprising information about the fall-back policy to a radio device comprising an eUICC, said radio device having a wireless network connection. The instructions also cause the platform to detect an event relating to a first subscription of the radio device with a first network operator for a wireless network connection. The instructions also cause the platform to send an event message comprising information about the detected event to the radio device via the wireless network connection of the first subscription. The instructions also cause the platform to determine that the detected event implies that the radio device will lose the network connection of the first subscription. The instructions also cause the platform to fall back in accordance with the stored fall-back policy, thereby enabling the connectivity service platform to communicate with the radio device via a network connection of a second subscription of the radio device instead of the first subscription.

According to another aspect of the present disclosure, there is provided a computer program comprising computer program code which is able to, when run on processor circuitry of a connectivity service platform, cause the connectivity service platform to store a fall-back policy. The code is also able to cause the platform to send a policy message comprising information about the fall-back policy to a radio device comprising an eUICC, said radio device having a wireless network connection. The code is also able to cause the platform to detect an event relating to a first subscription of the radio device with a first network operator for a wireless network connection. The code is also able to cause the platform to send an event message comprising information about the detected event to the radio device via the wireless network connection of the first subscription. The code is also able to cause the platform to determine that the detected event implies that the radio device will lose the network connection of the first subscription. The code is also able to cause the platform to fall back in accordance with the stored fall-back policy, thereby enabling the connectivity service platform to communicate with the radio device via a network connection of a second subscription of the radio device instead of the first subscription.

According to another aspect of the present disclosure, there is provided a computer program product comprising an embodiment of the computer program for a connectivity service platform, of the present disclosure, and a computer readable means on which the computer program is stored.

According to another aspect of the present disclosure, there is provided a method performed by a radio device, comprising an eUICC, in a communication network. The method comprises receiving a policy message, comprising information about a platform fall-back policy, from a connectivity service platform via a wireless network connection. The method also comprises storing a device fall-back policy based on said received policy message. The method also comprises receiving an event message comprising information about a detected event, from the connectivity service platform via a wireless network connection of a first subscription of the radio device with a first network operator. The method also comprises determining that the event of the received event message implies that the radio device will lose the network connection of the first subscription. The method also comprises falling back in accordance with the stored fall-back policy, thereby enabling the radio device to obtain a wireless network connection of a second subscription of the radio device instead of the first subscription.

According to another aspect of the present disclosure, there is provided a computer program product comprising computer-executable components for causing a radio device to perform an embodiment of the method performed by a radio device, of the present disclosure, when the computer-executable components are run on processor circuitry comprised in the radio device.

According to another aspect of the present disclosure, there is provided a radio device for a communication network. The radio device comprises an eUICC, processor circuitry, and storage storing instructions that, when executed by the processor circuitry, cause the radio device to receive a policy message, comprising information about a platform fall-back policy, from a connectivity service platform via a wireless network connection. The instructions also cause the radio device to store a device fall-back policy based on said received policy message. The instructions also cause the radio device to receive an event message comprising information about a detected event from the connectivity service platform via a wireless network connection of a first subscription of the radio device with a first network operator. The instructions also cause the radio device to determine that the event of the received event message implies that the radio device will lose the network connection of the first subscription. The instructions also cause the radio device to fall back in accordance with the stored fall-back policy, thereby enabling the radio device to obtain a wireless network connection of a second subscription of the radio device instead of the first subscription.

According to another aspect of the present disclosure, there is provided a computer program comprising computer program code which is able to, when run on processor circuitry of a radio device comprising an eUICC in a communication network, cause the radio device to receive a policy message, comprising information about a platform fall-back policy, from a connectivity service platform via a wireless network connection. The code is also able to cause the radio device to store a device fall-back policy based on said received policy message. The code is also able to cause the radio device to receive an event message comprising information about a detected event from the connectivity service platform via a wireless network connection of a first subscription of the radio device with a first network operator. The code is also able to cause the radio device to determine that the event of the received event message implies that the radio device will lose the network connection of the first subscription. The code is also able to cause the radio device to fall back in accordance with the stored fall-back policy, thereby enabling the radio device to obtain a wireless network connection of a second subscription of the radio device instead of the first subscription.

According to another aspect of the present disclosure, there is provided a computer program product comprising an embodiment of the computer program for the radio device, of the present disclosure, and a computer readable means on which the computer program is stored.

By having a fall-back policy, and by the connectivity service platform (below also called "the platform") informing the radio device about said policy, both the network side, as represented by the platform, and the radio device can fall back, each by itself since network connectivity is lost, taking into account knowledge of each other's fall-back policies. Both the platform and the radio device may e.g. fall back at the same time and in the same way (typically to the same network subscription) in a synchronised manner. Thus, the risk of the radio device falling back to one subscription, or keeping a non-functional subscription, and the network (platform) falling back to another subscription (or keeping a non-functional subscription), which would result in a permanent loss of connectivity, can be eliminated. Typically, the fall-back policy of the platform corresponds to/is the same as the fall-back policy of the radio device. The fall-back is in response to a detected event that is determined to imply that the radio device will lose its network connectivity via the currently enabled subscription.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5a is a schematic flow chart of an embodiment of a method of a connectivity service platform, of the present disclosure.

FIG. 5b is a schematic flow chart of another embodiment of a method of a connectivity service platform, of the present disclosure.

FIG. 6a is a schematic flow chart of an embodiment of a method of a radio device, of the present disclosure.

FIG. 6b is a schematic flow chart of another embodiment of a method of a radio device, of the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
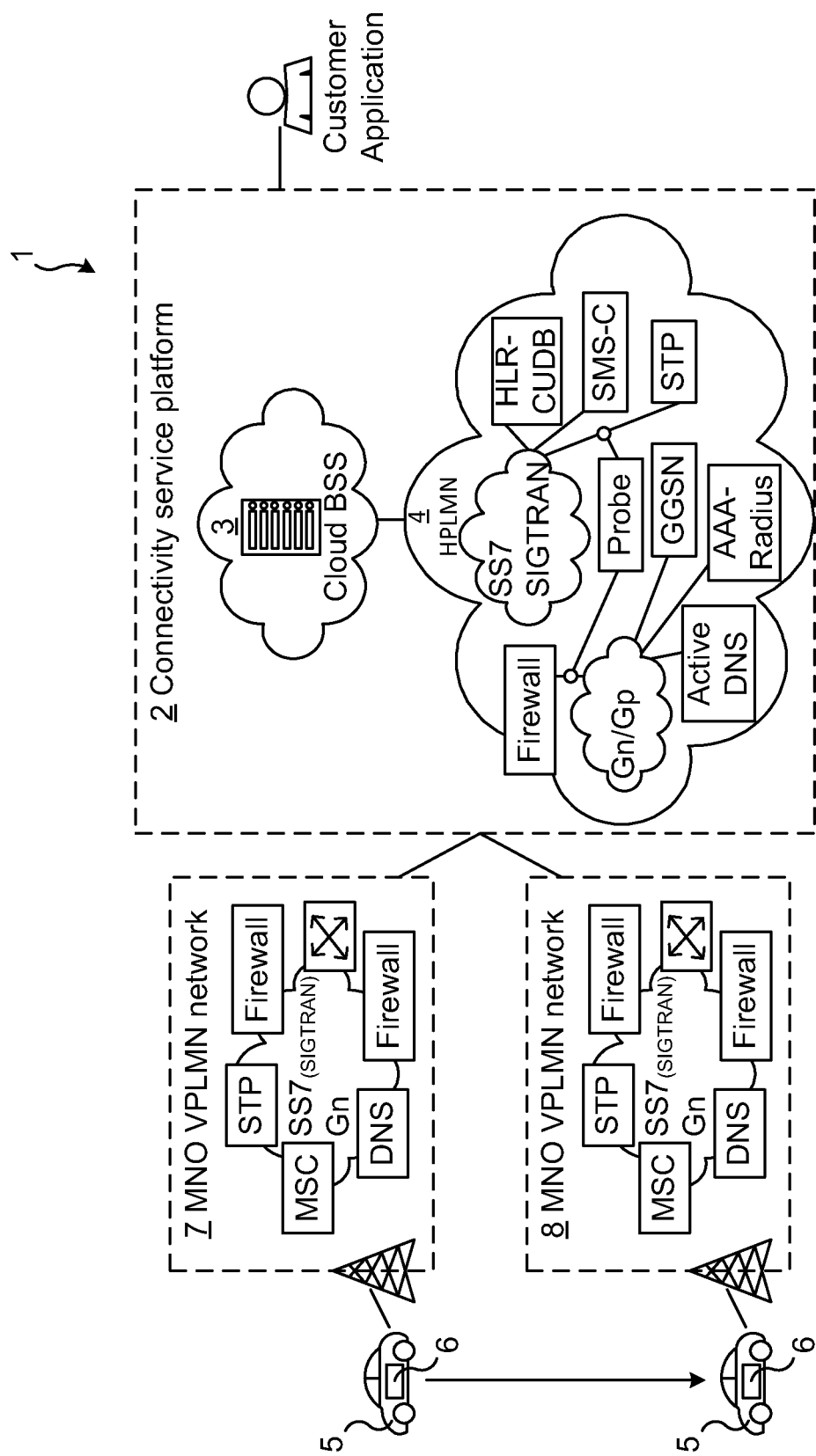
FIG. 1 is a schematic Nock diagram illustrating an embodiment of a communication network in accordance with the present disclosure.

FIG. 1 is a schematic block diagram illustrating an embodiment of a communication network 1 in accordance with the present disclosure. The communication network 1 comprises a connectivity service platform 2, e.g. an Ericsson Device Connection Platform (EDCP or DCP) for providing CN functionality for customers in the form of several different mobile network operators (MNO) for a plurality of radio devices 5 having eUICC 6, e.g. M2M devices 5. Each of the radio devices may 5 be any device or user equipment (UE), mobile or stationary, enabled to communicate over a radio cannel in a communications network, for instance but not limited to e.g. mobile phone, smart phone, modem, sensors, meters, vehicles such as cars or the like, household appliances, medical appliances, media players, cameras, or any type of consumer electronic, for instance but not limited to television, radio, lighting arrangements, tablet computer, laptop, or personal computer (PC). The connectivity service platform 2 of the embodiment of FIG. 1 comprises a cloud business support system (BSS) 3 as well as a cloud home public land mobile network (HPLMN) 4. The HPLMN 4 comprises any regular CN nodes or modules of a radio communication network, e.g. home location register (HLR), Gateway General Packet Radio Service (GPRS) support node (GGSN), short message service centre (SMSC), Signal Transfer Point (STP), Domain Name System (DNS), and authentication, authorization and accounting (AAA) RADIUS, for e.g. Signalling System 7 (SS7) and/or Integrated Services Digital Network (ISDN) communications protocols of signalling transport (SIGTRAN). The radio device 5 has a wireless connection to the network 1 and the platform 2 via a wireless connection provided by a visited PLMN (VPLMN) of a network operator 7 or 8. Each of the VPLMN also comprise the nodes and modules typical for such networks. Each operator 7, 8 has a radio access network (RAN) with base stations via which radio devices may connect wirelessly provided that they have an enabled and active subscription with the operator. Since the radio device has an eUICC, the eUICC needs to be flash updated in order to change to a new subscription for its wireless connection. Instructions for the update need typically be received via its wireless connection of an old subscription before the change to the new subscription. The new subscription, may be with the same operator 7 as the old subscription, but it may more commonly be with a new operator 8.

The platform 2-eUICC 6 synchronized fall-back mechanism (event based) in accordance with the present disclosure, makes sure that connectivity remains during eUICC subscription management life cycle, e.g. through subscription management operations such as enable/disable/activate/pause/deactivate/terminate/etc, which may otherwise lead to that the eUICC connectivity may be lost permanently in case of the e.g. any of the following examples:

The current enabled subscription is terminated on platform 2, and deleted on eUICC 6.

The last available subscription is terminated on platform 2, and deleted on eUICC 6.

The current enabled subscription is disabled on platform 2, and disabled on eUICC 6, without a new subscription having been enabled on platform 2 and eUICC 6 beforehand.

A newly enabled subscription is in a deactivated/paused/terminated state in the platform 2.

Event based fall-back may thus occur on both eUICC and the platform simultaneously, to enable real-time fall-back on both eUICC and on platform side based on real-time events.

Event based Fall-back mechanism in accordance with the present disclosure:

1) Network 2 side: A platform 2 fall-back event detector detects the real-time events and decides to fall back according to its predefined fall-back policy. The platform 2 enables the second (e.g. provisioning) subscription in its BSS 3/HLR 2) eUICC 6 side: A eUICC 6 fall-back event detector detects the real-time events and decides to fall-back according to its predefined fall-back policy (typically the same policy as on the platform 2 side). eUICC enables the second (e.g. provisioning) subscription and reconnects to network using the second subscription.

In some embodiments of the present disclosure, the radio device 5 sends, to the platform 2, a response to the event message sent by the platform 2. This ensures the platform 2 that the radio device 5 has properly received the event message before the platform 2 falls back, eliminating the risk of the platform 2 falling back while the radio device 5 is agnostic about that it is expected to fall back.

In some embodiments of the present disclosure, the event which is detected by the platform 2 is a subscription management operation. Such operations are executed by the platform 2 and the platform instructs the radio device 5 to also execute it. Examples of operations include e.g. to enable, disable, activate, pause, deactivate, terminate or the like, a subscription with an operator 7 or 8. Some such operations, e.g. to disable, deactivate or terminate a currently enabled subscription will lead to a loss of connectivity by the subscription. It will then be desirable for both the platform 2 and the device 5 to fall back in a coordinated manner, i.e. in accordance with their respective fall-back policies, in order to not loose, or to re-establish, a functioning wireless connection.

In some embodiments of the present disclosure, the falling back of the platform 2 comprises sending instructions to a network operator that the second subscription should be activated. This may be necessary in order for the operator 7 or 8 to activate/enable the fall-back subscription such that the radio device 5 can fall back to that new subscription to obtain network connectivity.

In some embodiments of the present disclosure, the falling back comprises, for both the platform 2 and the radio device 5, to enable the second (new/fall-back) subscription for enabling communication the radio device 5 and the platform 2 over the wireless connection of the second subscription.

In some embodiments of the present disclosure, the second (new/fall-back) subscription is with a second network operator 8, different than the first network operator 7.

In some embodiments of the present disclosure, the second (new/fall-back) subscription is a provisioning subscription of the radio device eUICC 6. The provisioning subscription may be suitable for fall-back since it is typically always present, even if not enabled, in the eUICC. This implies that also the platform 2 has to enable the provisioning subscription, and the operator 8 who provides the provisioning subscription has to activate it if it is not already active.

In some embodiments of the present disclosure, the detecting of an event comprises detecting a subscription management operation on the first (old/current) subscription with the first network operator 7, such as to disable, deactivate or terminate the first subscription. Such an operation would imply that the radio device 5 will loose network connectivity via the first subscription when the operation is executed in the radio device 5 and the platform 2.

Figure 2:
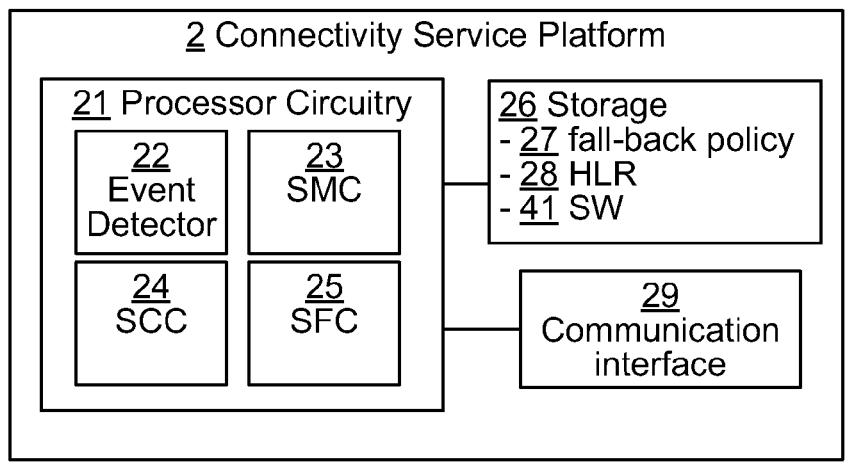
FIG. 2 is a schematic Nock diagram of an embodiment of a connectivity service platform of the present disclosure.

FIG. 2 is a schematic block diagram of an embodiment of a connectivity service platform 2 of the present disclosure. The platform 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor circuitry 21 is configured to run one or several computer program(s) or software 41 stored in a storage 26 e.g. comprising a memory. The processor circuitry comprises one or several modules 22-25 as a result of executing SW 41 in the storage 26, e.g. the fall-back event detector 22, a subscription management component (SMC) 23, a subscription change component (SCC) 24 and/or a subscription fall-back component (SFC) 25 which is below, in FIG. 8, as an example depicted as comprising the fall-back event detector 22 as well as the executed fall-back policy 27. Each of these modules may be formed by separate or dedicated processors of the processor circuitry 21 or by a common processor. The storage 26 may comprise one or several storage units, of one or several type(s), each of which can be regarded as a computer readable means as discussed herein and may e.g. be in the form of a Random Access Memory (RAM), a Mash memory or other solid state memory, or a hard disk, or be a combination thereof. Also the HLR 28 as well as the fall-back policy 27 is part of/stored in the storage 26. The processor circuitry 21 is also configured to store data in the storage 26, as needed. The platform 2 also comprises a communication interface 29 for communication with the radio device 5 as well as with other parts of the communication network 1 such as the operators 7 and 8. The communication interface may comprise a transmitter and a receiver for, in cooperation with the processor circuitry 21, sending and receiving data messages and other digital signalling.

Figure 3:
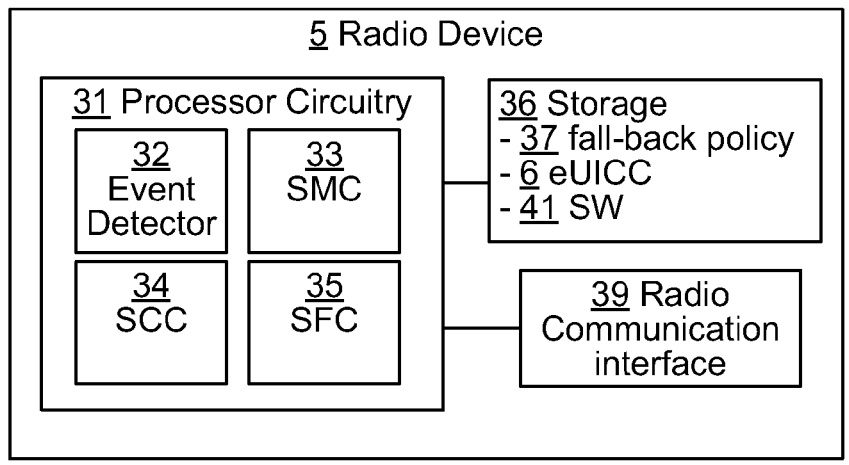
FIG. 3 is a schematic block diagram of an embodiment of a radio device of the present disclosure.

FIG. 3 is a schematic block diagram of an embodiment of a radio device 5 of the present disclosure. The radio device 5 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software 41 stored in a storage 36 e.g. comprising a memory. The processor circuitry comprises one or several modules 32-35 as a result of executing SW 41 in the storage 36, e.g. the fall-back event detector 32, a subscription management component (SMC) 33, a subscription change component (SCC) 34 and/or a subscription fall-back component (SFC) 35 which is below, in FIG. 8, as an example depicted as comprising the fall-back event detector 32 as well as the executed fall-back policy 37. Each of these modules may be formed by separate or dedicated processors of the processor circuitry 31 or by a common processor. The storage 36 may comprise one or several storage units, of one or several type(s), each of which can be regarded as a computer readable means as discussed herein and may e.g. be in the form of a Random Access Memory (RAM), a Mash memory or other solid state memory, or a hard disk, or be a combination thereof. Also the eIUCC 6 of the device 5 as well as the fall-back policy 37 is part of/stored in the storage 36. The processor circuitry 31 is also configured to store data in the storage 36, as needed. The radio device 5 also comprises a radio communication interface 39 for communication with the platform 2 as well as with other parts of the communication network 1 such as the operators 7 and 8. The communication interface may comprise a transmitter and a receiver, as well as an antenna, for, in cooperation with the processor circuitry 31, sending and receiving data messages and other digital signalling wirelessly.

Figure 4:
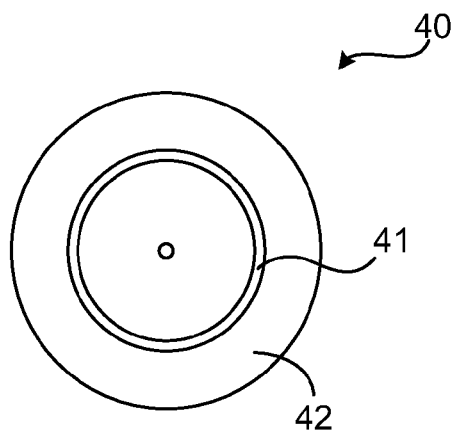
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause a device, e.g. the platform 2 or the radio device 5 as discussed herein to perform an embodiment of the method of the present disclosure. The computer program/computer-executable components may be run on the processor circuitry 21 of the platform 2 or the processor circuitry 31 of the radio device 5 for causing the device to perform the method. The computer program product 40 may e.g. be comprised in a storage 26 or 36 comprised in the device and associated with the processor circuitry 21 or 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Mash memory.

FIG. 5*a* is a schematic flow chart of an embodiment of a method of the connectivity service platform 2, of the present disclosure. The platform 2 stores 50 its fall-back policy 27 in its storage 26. The platform 2 sends 51 a policy message comprising information about the fall-back policy 27 to the radio device 5 comprising an eUICC 6, said radio device having a wireless network connection (via the first subscription or via another earlier subscription). The policy message should be sent 51 before the later step of falling back 55. The platform 2 detects 52 an event (e.g. a subscription management operation) relating to a first subscription of the radio device with a first the network operator 7 for a wireless network connection. The first subscription is the currently enabled subscription which is currently providing the wireless network connection of the radio device. The detecting 52 may e.g. comprise receiving an event message from the first network operator 7, or the event may be from within the platform 2 itself. The platform 2 then sends 53 an event message comprising information about the detected 52 event to the radio device 5 via the wireless network connection of the first subscription, e.g. via SIMOTA (SIM over-the-air) remote provisioning technology through the wireless network connection of the first subscription. The event message should be sent 53 before the later step of falling back 55. The platform 2 determines 54 that the detected 52 event implies that the radio device 5 will lose the network connection of the first subscription. This determining 54 is done before the falling back 55 and after the detecting 52 of the event, but could be before, after or concurrently with the sending 53 of the event message. Then the platform 2 falls back 55 in accordance with the stored 50 fall-back policy 27, thereby enabling the connectivity service platform 2 to communicate with the radio device 5 via a network connection of the second subscription of the radio device instead of the first subscription.

FIG. 5*b* is a schematic flow chart of another embodiment of a method of the connectivity service platform 2, of the present disclosure. The steps of storing 50, sending 51 a policy message, detecting 52, sending 53 an event message, determining 54 and falling back 55 are as discussed in relation to FIG. 5*a*.

Further, the platform 2 may in some embodiments receive 56, from the radio device 5, a response to the event message, before the falling back 55. In some embodiments, the platform 2 may, if the event is a subscription management operation, execute 57 the subscription management operation on the first subscription, whereby the radio device 5 will lose the network connection of the first subscription, as determined 54. The executing 57 may be done before (as part of regular subscription management) or as a part of the falling back 55. In some embodiments, the falling back 55 comprises sending 58 instructions to a network operator 8 providing the second subscription that the second subscription should be activated by the operator 8. In some embodiments, the falling back 55 comprises enabling 59 the second subscription in the connectivity service platform 2 for communication with the radio device 5.

FIG. 6*a* is a schematic flow chart of an embodiment of a method of the radio device 5, of the present disclosure. The radio device receives 60 a policy message, comprising information about a fall-back policy 27, from the connectivity service platform 2 via a wireless network connection (via the first subscription or via another earlier subscription). The policy message is received 60 before the later step of falling back 64. The radio device stores 61 a fall-back policy 37 based on said received 60 policy message. The fall-back policy 37 is typically the same or substantially corresponding to the fall-back policy 27 of the platform 2. The radio device 5 receives 62, from the connectivity service platform 2, an event message comprising information about a detected event, via a wireless network connection of a first subscription of the radio device with the first network operator 7. The event message is received 62 before the later step of falling back 64. The radio device 5 determines 63 that the event of the received 62 event message implies that the radio device 5 will lose the network connection of the first subscription. This determining 63 is done before the falling back 64 and after the receiving 62 of the event message. Then, the radio device falls back 64 in accordance with the stored 61 fall-back policy 37, thereby enabling the radio device 5 to obtain a wireless network connection of a second subscription of the radio device instead of the first subscription.

FIG. 6*b* is a schematic flow chart of another embodiment of a method of the radio device 5, of the present disclosure. The steps of receiving 60 a policy message, storing 61, receiving 62 an event message, determining 63 and falling back 64 are as discussed in relation to FIG. 6*a*. Further, the method of the radio device may comprise sending 65 a response to the received 63 event message to the connectivity service platform 2 via the first subscription network connection before the falling back 64, thereby informing the platform 2 that the radio device has properly received the event message. In some embodiments, when the event is a subscription management operation, the radio device executes 66 the subscription management operation on the first subscription whereby the radio device 5 will lose the network connection of the first subscription. The executing 66 may be done before (as part of regular subscription management) or as a part of the falling back 64. In some embodiments, the falling back 64 comprises enabling 67 the second subscription in the radio device 5 for obtaining the wireless network connection of the second subscription, for communication with the platform 2 and other parts of the network 1.

Figure 7:
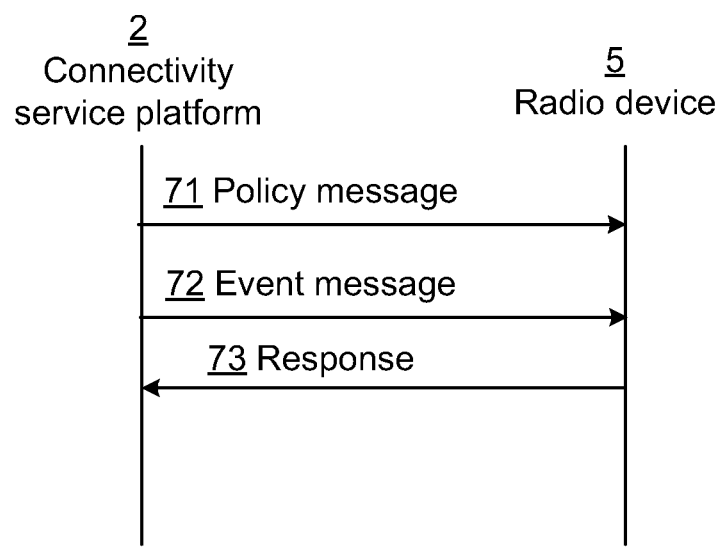
FIG. 7 is a schematic signalling diagram illustrating embodiments of the present disclosure.

FIG. 7 is a schematic signalling diagram illustrating embodiments of the present disclosure. A policy message 71 is sent 51 from the platform 2 and received 60 by the radio device 5. An event message 72 is sent 53 by the platform 2 and received 62 by the radio device 5. Optionally, a response 73 to the event message 72 is sent 65 by the radio device 5 and received 56 by the platform 2.

Example

Fall-Back Policy, on Both Platform 2 (Network) and eUICC 6 Side

In Case of the Following Events (for Examples but not Restricted to):

The current enabled subscription is terminated on platform 2, and deleted on eUICC 6.

The last available subscription is terminated on platform 2, and deleted on eUICC 6.

The current enabled subscription is disabled on platform 2, and disabled on eUICC 6, without a new subscription having been enabled on platform 2 and eUICC 6 beforehand.

A newly enabled subscription is in a deactivated/paused/terminated state in the platform 2.

Then, fall-back shall be executed on both eUICC 6 and platform 2 side. The second (fall-back) subscription could be e.g. the provisioning subscription.

Figure 8:
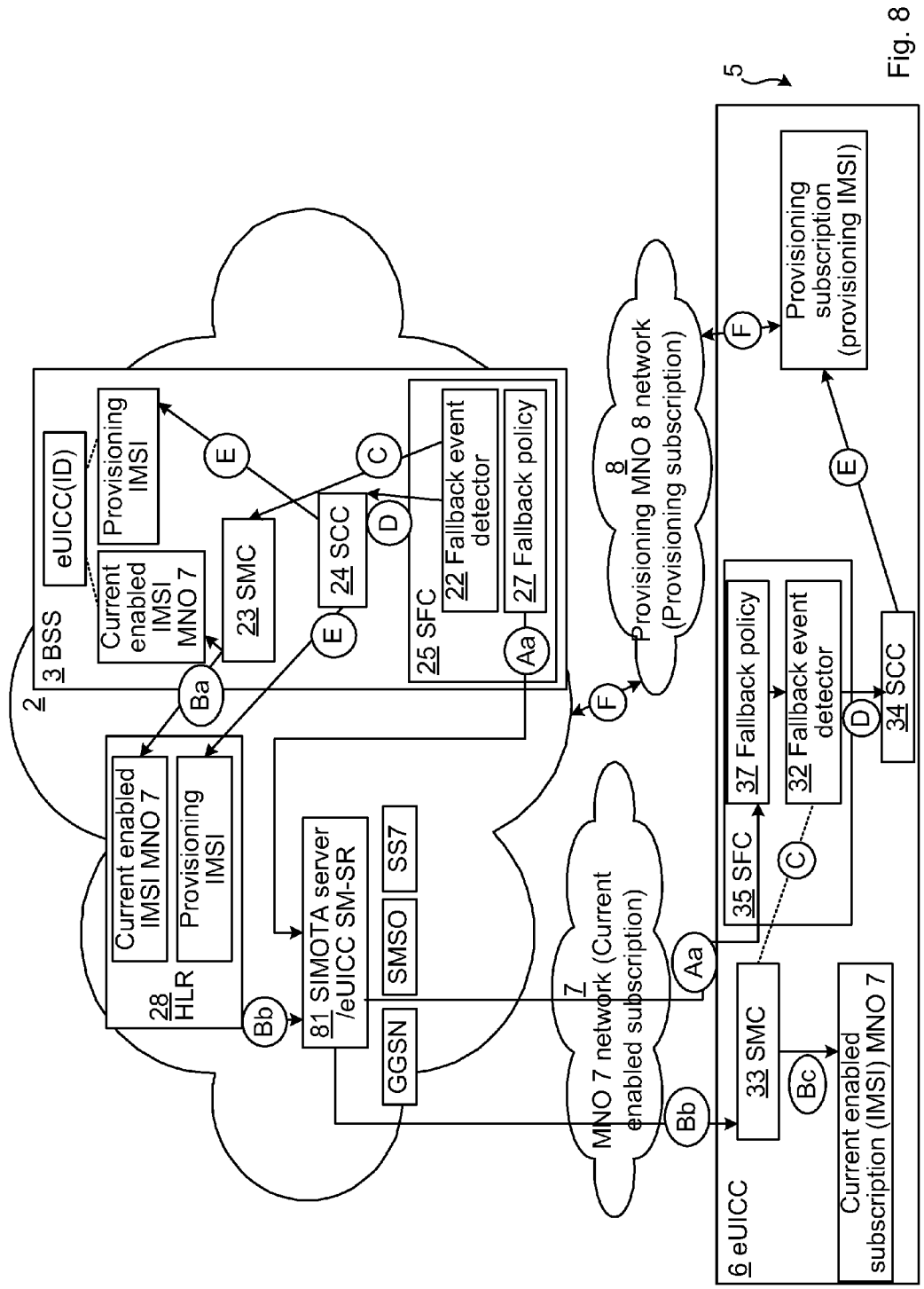
FIG. 8 is a schematic Nock diagram illustrating example embodiments of the present disclosure.

Reference is made to FIG. 8.

Step A

Aa) The Subscription Fall-back Component (SFC) 25 in the platform 2 BSS 3 defines the fall-back policy 27, and sends 51 the fall-back policy message 71 to the Subscription Fall-back Component (SFC) 35 in the eUICC 6 of the radio device 5, by SIM provisioning by over-the-air (SIMOTA), eUICC subscription manager—secure routing (SM-SR), server 81 via the current enabled connectivity (MNO 7, international mobile subscriber (IMSI) connectivity).

Ab) once the fall-back policy 27 has been defined, the Fall-back Event Detector 22 on platform 2 side starts running and monitoring the fall-back events according to the fall-back policy 27.

Ac) once the fall-back policy 37 has been defined, the Fall-back Event Detector 32 on eUICC side starts running and monitoring the fall-back events according to the fall-back policy 37.

Step B

Ba) The subscription management component (SMC) 23 in the platform 2 BSS 3 triggers subscription management operations (enable/disable/activate/deactivate/terminate/etc) on the current enabled (first) subscription (IMSI) MNO 7, both in DCP BSS 3 and HLR 28. Note: the operation here is only triggered, buffered on platform 2, but not yet executed.

Bb) The subscription management component (SMC) 23 in the platform 2 BSS 3 notifies 53 the subscription management component (SMC) 33 in the eUICC 6 via the current (first) enabled subscription MNO 7 connectivity, to trigger the same subscription management operation (enable/disable/activate/deactivate/terminate/etc) on the current enabled subscription (IMSI) MNO 7, on eUICC.

Bc) SMC 33 in eUICC 6 triggers the same subscription management operation (enable/disable/activate/deactivate/terminate/etc) on the current enabled subscription (IMSI) MNO 7, on eUICC. Note: the operation here is only triggered, buffered on the eUICC 6, but not yet executed.

An alternative way is that after eUICC 6 receives 62 the subscription management operation from the platform 2, it shall send 65 acknowledge/confirmation to the platform 2, and then both the platform and the eUICC 6 can execute the buffered subscription management operation already in step B.

Step C

On Both eUICC and Platform Side:

The fall-back event detector 22/32 determines 54/63 whether the subscription management operation triggered in step B shall trigger subscription fall-back or not, according to the fall-back policy 27/37 defined in the SFC 25/35.

Step D

On Both eUICC and Platform Side:

If the decision in accordance with the fall-back policy 27/37 is that it should not trigger any fall-back, the triggered and buffered subscription management operation from step B shall be executed (if not yet executed in step B).

If the decision in accordance with the fall-back policy 27/37 is that it should fall back to the provisioning subscription, the fall-back event detector 22/32 shall notify the subscription change component (SCC) 24/34 to change the subscription to the provisioning subscription. And then the triggered and buffered subscription management operation from step B shall be executed 57/66 either in this step D (if not yet executed from step B), or in a later step.

Step E eUICC 6 enables 67 its provisioning subscription, and disables the current subscription MNO 7 (if MNO 7 subscription is still enabled).

Platform 2 enables 59 the provisioning subscription in BSS 3/HLR 28, and disables the current subscription MNO 7 (if MNO 7 subscription still enabled).

Step F eUICC 6 tries again to connect to the network 1 via the provisioning subscription connectivity. The platform 2 waits until the device 5 connects via the provisioning subscription.

Note: If there are other available subscriptions (operational subscription) than the provisioning subscription existing on both eUICC 6 and platform 2, it is also possible to fall back 55/64 to that subscription, why the present disclosure is not restricted to fall-back to the provisioning subscription only.

Below follow some other aspects of the present disclosure.

According to an aspect of the present disclosure, there is provided a connectivity service platform 2 for a communication network 1. The connectivity service platform 2 comprises means (e.g. the storage 26) for storing 50 a fall-back policy 27. The connectivity service platform 2 also comprises means (e.g. the processor circuitry 21, such as the SFC 25, in cooperation with the communication interface 29) for sending 51 a policy message 71 comprising information about the fall-back policy 27 to a radio device 5 comprising an eUICC 6, said radio device having a wireless network connection. The connectivity service platform 2 also comprises means (e.g. the processor circuitry 21, such as the event detector 22) for detecting 52 an event relating to a first subscription of the radio device with a first network operator 7 for a wireless network connection. The connectivity service platform 2 also comprises means (e.g. the processor circuitry 21, such as the SMC 23, in cooperation with the communication interface 29) for sending 53 an event message 72 comprising information about the detected 52 event to the radio device 5 via the wireless network connection of the first subscription. The connectivity service platform 2 also comprises means (e.g. the processor circuitry 21, such as the event detector 22) for determining 54 that the detected 52 event implies that the radio device 5 will lose the network connection of the first subscription. The connectivity service platform 2 also comprises means (e.g. the processor circuitry 21, such as the SCC 24) for falling back 55 in accordance with the stored fall-back policy 27, thereby enabling the connectivity service platform 2 to communicate with the radio device 5 via a network connection of a second subscription of the radio device instead of the first subscription.

According to another aspect of the present disclosure, there is provided a radio device 5 for a communication network 1. The radio device comprises an eUICC 6. The radio device 5 also comprises means (e.g. the processor circuitry 31, such as the SFC 35, in cooperation with the radio communication interface 39) for receiving 60 a policy message 71, comprising information about a fall-back policy 27, from a connectivity service platform 2 via a wireless network connection. The radio device 5 also comprises means (e.g. the storage 36) for storing 61 a fall-back policy 37 based on said received 60 policy message. The radio device 5 also comprises means (e.g. the processor circuitry 31, such as the SMC 33, in cooperation with the radio communication interface 39) for receiving 62 an event message 72 comprising information about a detected event, from the connectivity service platform 2 via a wireless network connection of a first subscription of the radio device with a first network operator 7. The radio device 5 also comprises means (e.g. the processor circuitry 31, such as the event detector 32) for determining 63 that the event of the received 62 event message implies that the radio device 5 will lose the network connection of the first subscription. The radio device 5 also comprises means (e.g. the processor circuitry 31, such as the SCC 34) for falling back 64 in accordance with the stored fall-back policy 37, thereby enabling the radio device 5 to obtain a wireless network connection of a second subscription of the radio device instead of the first subscription.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a connectivity service platform in a communication network, the method comprising:
storing a fall-back policy;
sending a policy message comprising information about the fall-back policy to a radio device comprising an embedded Universal Integrated Circuit Card, eUICC, said radio device having a wireless network connection;
detecting an event that is a subscription management operation to disable, deactivate or terminate a first subscription of the radio device with a first network operator for a wireless network connection;
sending an event message to trigger the detected subscription management operation in the radio device via the wireless network connection of the first subscription;
determining that the detected subscription management operation implies that the radio device will lose the network connection of the first subscription; and
falling back in accordance with the stored fall-back policy, thereby enabling, in the connectivity service platform, a second subscription of the radio device different from the first subscription;
executing the subscription management operation on the first subscription, after the sending of the event message, whereby the radio device will lose the network connection of the first subscription.

2. The method of claim 1, further comprising:
receiving a response to the event message, from the radio device, before the falling back.

3. The method of claim 1, wherein the falling back comprises sending instructions to a network operator providing the second subscription that the second subscription should be activated.

4. The method of claim 1, wherein the falling back comprises enabling the second subscription in the connectivity service platform for communication with the radio device.

5. The method of claim 1, wherein the second subscription is with a second network operator, different than the first network operator.

6. The method of claim 1, wherein the second subscription is a provisioning subscription of the radio device eUICC.

7. The method claim 1, wherein the detecting an event comprises detecting a subscription management operation on the first subscription with the first network operator, such as to disable, deactivate or terminate the first subscription.

8. A connectivity service platform for a communication network, the platform comprising processor circuitry configured to:
store a fall-back policy;
send a policy message comprising information about the fall-back policy to a radio device comprising an embedded Universal Integrated Circuit Card, eUICC, said radio device having a wireless network connection;
detect an event that is a subscription management operation to disable, deactivate or terminate a first subscription of the radio device with a first network operator for a wireless network connection;
send an event message to trigger the detected subscription management operation in the radio device via the wireless network connection of the first subscription;
determine that the detected event implies that the radio device will lose the network connection of the first subscription; and
fall back in accordance with the stored fall-back policy, thereby enabling, in the connectivity service platform, a second subscription of the radio device different from the first subscription;
execute the subscription management operation on the first subscription, after the sending of the event message, whereby the radio device will lose the network connection of the first subscription.

9. A non-transitory computer-readable medium storing computer program code that, when executed by processor circuitry in a connectivity service platform, causes the connectivity service platform to:
store a fall-back policy;
send a policy message comprising information about the fall-back policy to a radio device comprising an embedded Universal Integrated Circuit Card, eUICC, said radio device having a wireless network connection;
detect an event that is a subscription management operation to disable, deactivate or terminate a first subscription of the radio device with a first network operator for a wireless network connection;
send an event message to trigger the detected subscription management operation in the radio device via the wireless network connection of the first subscription;
determine that the detected subscription management operation implies that the radio device will lose the network connection of the first subscription; and
fall back in accordance with the stored fall-back policy, thereby enabling, in the connectivity service platform, a second subscription of the radio device different from the first subscription;
execute the subscription management operation on the first subscription, after the sending of the event message, whereby the radio device will lose the network connection of the first subscription.

10. A method performed by a radio device, comprising an embedded Universal Integrated Circuit Card, eUICC, in a communication network, the method comprising:
receiving a policy message, comprising information about a platform fall-back policy, from a connectivity service platform via a wireless network connection;
storing a device fall-back policy based on said received policy message;
receiving, from the connectivity service platform, an event message indicating an event that is a subscription management operation to disable, deactivate or terminate a first subscription of the radio device with a first network operator, said event message being received from the connectivity service platform via a wireless network connection of the first subscription;

determining that the subscription management operation implies that the radio device will lose the network connection of the first subscription; and falling back in accordance with the stored fall-back policy, thereby enabling the radio device to obtain a wireless network connection of a second subscription of the radio device different from the first subscription;

executing the subscription management operation on the first subscription, after the receiving of the event message, whereby the radio device will lose the network connection of the first subscription.

11. The method of claim 10, further comprising:
sending a response to the received event message to the connectivity service platform via the first subscription network connection before the falling back.

12. The method of claim 10, wherein the falling back comprises enabling the second subscription in the radio device for obtaining the wireless network connection of the second subscription.

13. The method of claim 10, wherein the second subscription is with a second network operator, different than the first network operator.

14. The method of claim 10, wherein the second subscription is a provisioning subscription of the radio device eUICC.

15. The method of claim 10, wherein the event is a subscription management operation on the first subscription with the first network operator, such as to disable, deactivate or terminate the first subscription.

16. A radio device for a communication network, the radio device comprising:
an embedded Universal Integrated Circuit Card, eUICC;
processor circuitry; and
storage storing instructions that, when executed by the processor circuitry, cause the radio device to:
receive a policy message, comprising information about a platform fall-back policy, from a connectivity service platform via a wireless network connection;
store a device fall-back policy based on said received policy message;
receive, from the connectivity service platform, an event message indicating an event that is a subscription management operation to disable, deactivate or terminate a first subscription of the radio device with a first network operator, said event message received from the connectivity service platform via a wireless network connection of a first subscription of the radio device with a first network operator;
determine that the subscription management operation implies that the radio device will lose the network connection of the first subscription; and
fall back in accordance with the stored fall-back policy, thereby enabling the radio device to obtain a wireless network connection of a second subscription of the radio device different from the first subscription;
execute the subscription management operation on the first subscription, after the receiving of the event message, whereby the radio device will lose the network connection of the first subscription.

17. A non-transitory computer-readable medium storing computer program code that, when executed by processor circuitry of a radio device comprising an eUICC in a communication network, causes the radio device to:
receive a policy message, comprising information about a platform fall-back policy, from a connectivity service platform via a wireless network connection;
store a device fall-back policy based on said received policy message;
receive, from the connectivity service platform, an event message indicating an event that is a subscription management operation to disable, deactivate or terminate a first subscription of the radio device with a first network operator, said event message received from the connectivity service platform via a wireless network connection of a first subscription of the radio device with a first network operator;
determine that the subscription management operation implies that the radio device will lose the network connection of the first subscription; and
fall back in accordance with the stored fall-back policy, thereby enabling the radio device to obtain a wireless network connection of a second subscription of the radio device different from the first subscription;
execute the subscription management operation on the first subscription, after the receiving of the event message, whereby the radio device will lose the network connection of the first subscription.

18. The method of claim 1 wherein the radio device is a machine-to-machine (M2M) device.

19. The connectivity service platform of claim 8 wherein the radio device is a machine-to-machine (M2M) device.

20. The method of claim 10 wherein the radio device is a machine-to-machine (M2M) device.

21. The radio device of claim 16 wherein the radio device is a machine-to-machine (M2M) device.

* * * * *